United States Patent [19]
May

[11] 3,815,852
[45] June 11, 1974

[54] MACHINE MOUNT APPARATUS AND METHOD FOR LIMITING MOTION OF A HEAVY MACHINE

[76] Inventor: Richard W. May, 5 Leeland Tr., Lexington, Mass. 02173

[22] Filed: Oct. 13, 1972

[21] Appl. No.: 297,336

[52] U.S. Cl. .............................. 248/24, 248/358 R
[51] Int. Cl. ............................................. F16f 15/00
[58] Field of Search ............ 248/22, 19, 20, 21, 23, 248/15, 358 R, 24; 267/153; 188/1 B

[56] References Cited
UNITED STATES PATENTS

| | | | |
|---|---|---|---|
| 1,005,963 | 10/1911 | Groat et al. | 248/19 X |
| 2,267,172 | 12/1941 | Saurer | 248/22 |
| 2,359,942 | 10/1944 | Rosenzweig | 248/22 |
| 2,823,975 | 2/1958 | Kirby | 248/19 X |
| 2,929,592 | 3/1960 | Spaetgens | 248/21 |
| 3,351,308 | 11/1967 | Hirst | 248/358 R X |

FOREIGN PATENTS OR APPLICATIONS

| | | | |
|---|---|---|---|
| 639,666 | 10/1959 | Italy | 248/20 |
| 369,320 | 6/1963 | Switzerland | 248/22 |

*Primary Examiner*—J. Franklin Foss

[57] ABSTRACT

Motion of a heavy machine in space, as exemplified by a reciprocating screw injection molding machine in which internal shock forces are induced in the normal operating cycle of the machine while supported on a floor, is contained by machine-supporting members in which special motion-limiting means are provided. Limiting motion of the machine in space is accomplished by restraining forces representing reaction caused by resistance to horizontal displacement of a combination of motion-limiting components.

4 Claims, 8 Drawing Figures

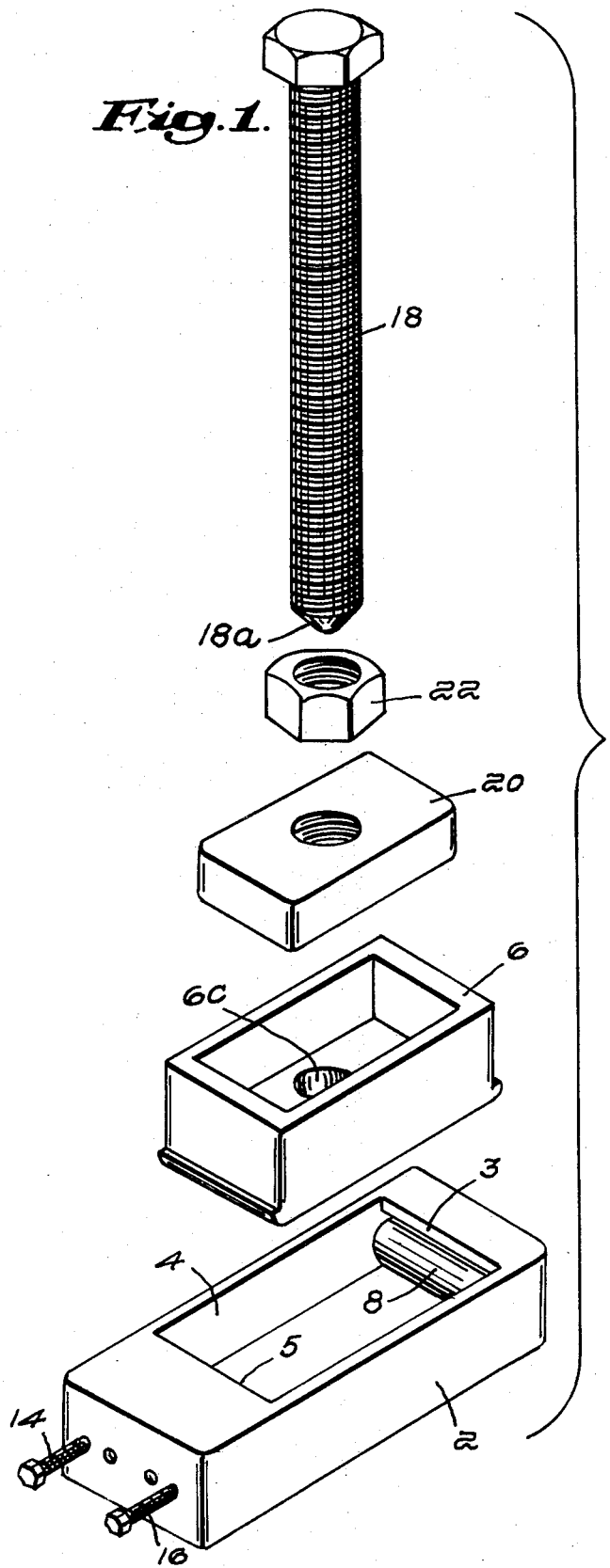

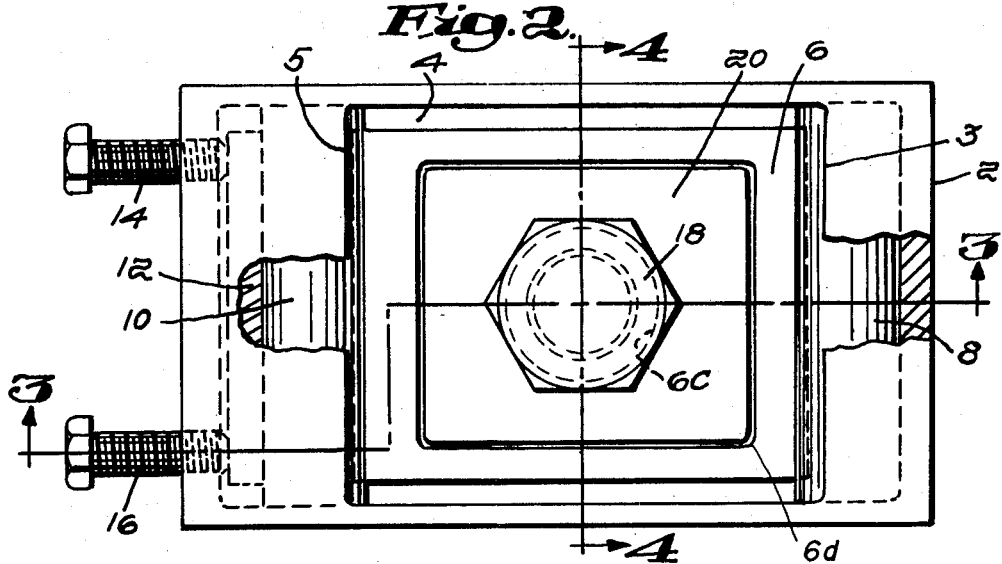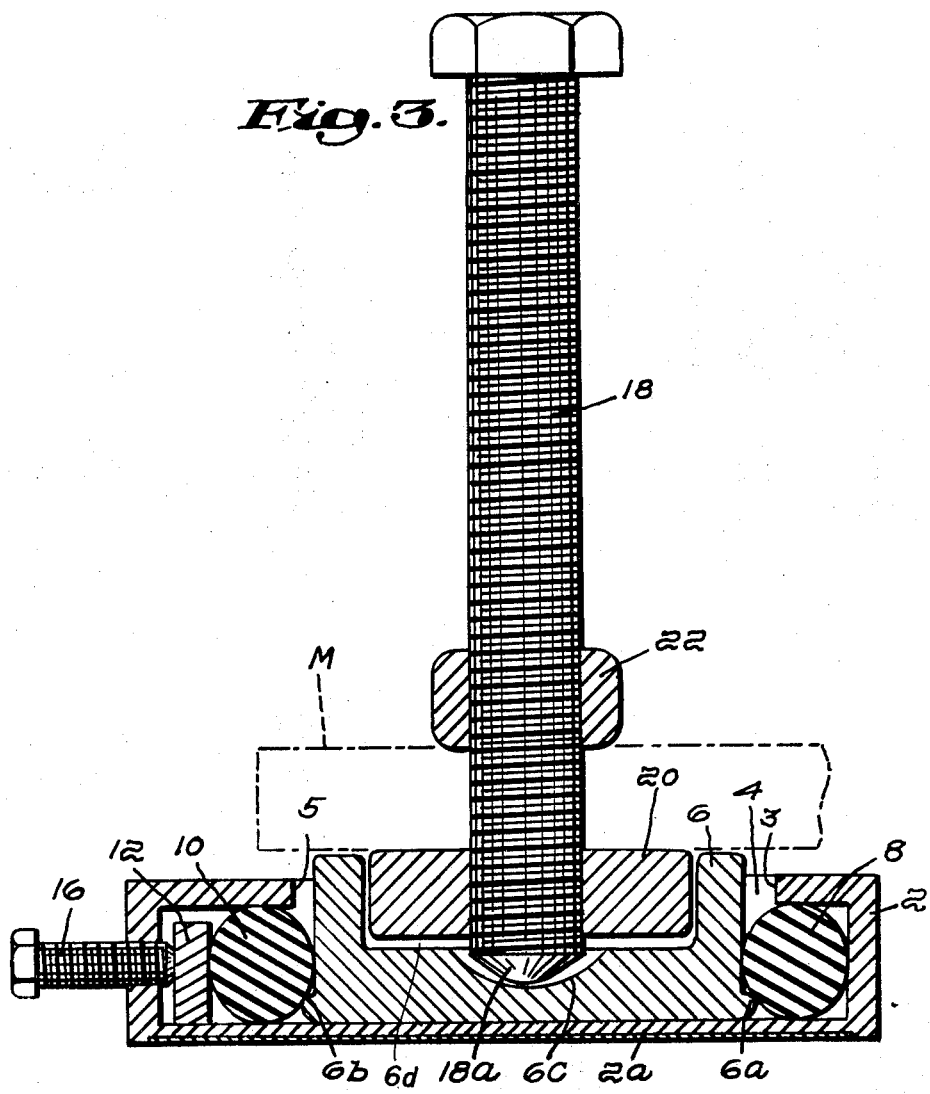

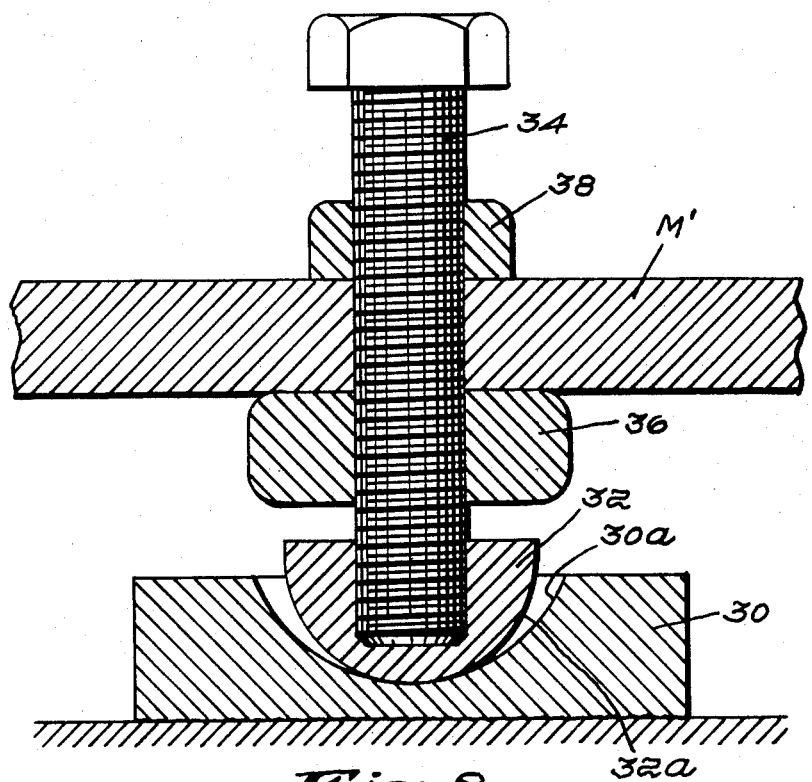
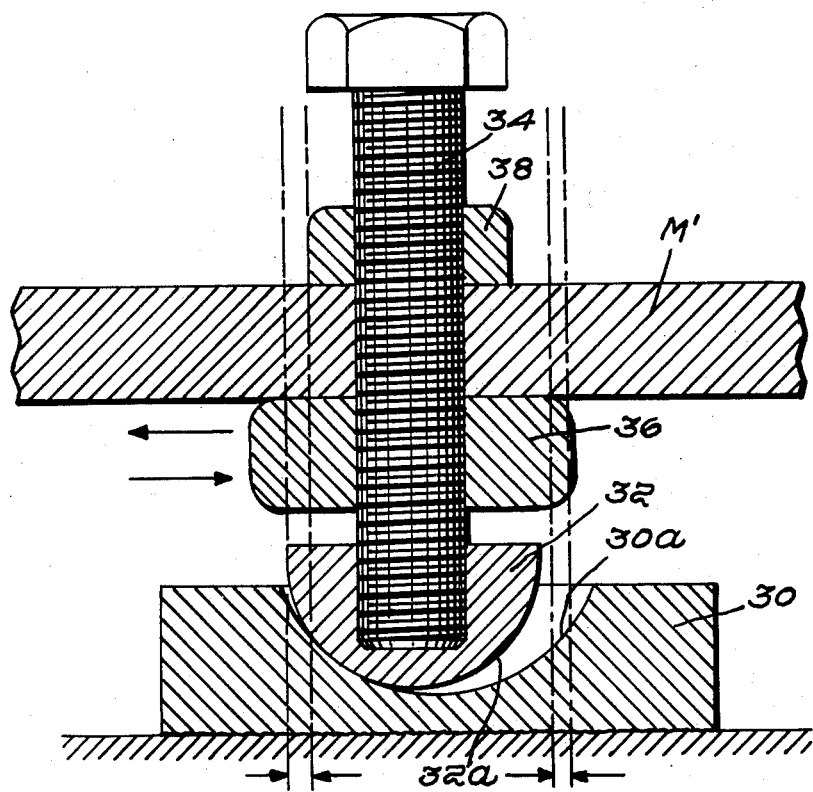

3,815,852

MACHINE MOUNT APPARATUS AND METHOD FOR LIMITING MOTION OF A HEAVY MACHINE

This invention relates to a method and apparatus for limiting motion of a heavy machine in which, for example, internal shock forces induced in such machine during its normal operation cycle tends to cause lateral displacement of the machine along a floor or other supporting base surface. The type of machine with which the invention is concerned is particularly exemplified by a machine of the class commonly referred to as a reciprocating screw injection molding machine.

It is customary in the art to support machines of the class noted on resilient mounting devices which act as shock absorbing members and operate to isolate displacement forces so that while displacement of the machine along a floor is substantially prevented, the machine itself is free to move in space with only a light resisting force being exerted. In many cases such freedom of movement in space may be objectionable and may create problems in the operation and maintenance of the machine at a suitably high level of efficiency.

It is, therefore, a chief object of the invention to provide an improved method and means for supporting a machine on a floor and limiting motion of the machine in space within limits which are not objectionable in operating and maintaining a machine efficiently.

Another object of the invention is to provide a machine mount assembly in which vertical support elements are effectively combined with the bottom of a machine of the general class referred to and held in a manner to provide for efficient mounting of the machine without appreciable displacement along the surface of the floor.

Another object of the invention is to provide a combination of features in a machine mount in which a friction surface is utilized in combination with resilient restraining means acting to oppose horizontal displacement.

Still another object is to provide an arrangement for containing resilient restraining means which may be varied in stiffness in accordance with load forces imposed.

Still another important feature is a leveling screw and motion-limiting means wherein hollowed retaining surfaces are provided and restraining forces are realized from reaction caused by the retaining surfaces acting to oppose the weight of the machine when shock forces are induced.

The nature of the invention and its other objects and novel features will be more fully understood and appreciated from the following description of a preferred embodiment of the invention selected for purposes of illustration and shown in the accompanying drawings, in which:

FIG. 1 is a perspective view showing the machine mount components in separated relationship to one another;

FIG. 2 is a plan view of the machine mount assembly of the invention;

FIG. 3 is a cros section taken on the line 3—3 of FIG. 2;

FIG. 7 is a cross sectional view of another desirable form of machine mount;

FIG. 8 is a cross sectional view similar to FIG. 7 but suggesting limited displacement of the components in relation to one another.

With the foregoing objectives in mind, I have conceived of improved methods and means for supporting machines of the class indicated in a manner such that motion in space of a machine subjected to shock forces is substantially limited or prevented during almost all operating conditions.

My improved method is based on the concept of utilizing vertical supporting elements which can be solidly attached to the bottom of the machine, and combining with these supporting elements base members and motion-limiting means constructed and arranged to contain the vertical supporting elements and machine substantially free from horizontal displacement due to shock forces.

One desirable form of machine mount of the invention is illustrated in FIGS. 1 to 6, inclusive. FIG. 7 illustrates another desirable form of machine mount of the invention.

The principal parts of the machine mount construction illustrated in FIGS. 1 – 6 include a base member for frictionally engaging a floor; secondly, a vertical supporting element which can be adjustably secured to the bottom of a machine such as a reciprocating screw injection molding machine in which internal shock forces are induced in a normal operating cycle of the machine; and thirdly, motion-limiting means for restraining horizontal motion of the vertical supporting elements and the machine bottom to which they may be secured.

It will be understood a plurality of machine mounts are required in supporting a machine of the type noted above and therefore the total restraining force for limiting motion of the machine is the combined effect of restraining a number of vertical supporting elements through which shock forces are dissipated. It will also be appreciated that the machine is required to be leveled, and since the weight of the machine is carried by the vertical supporting elements, these members may, in a preferred form, comprise threaded leveling bolts which can be solidly secured to the bottom of the machine in any desired position of vertical adjustment.

Figure 4:
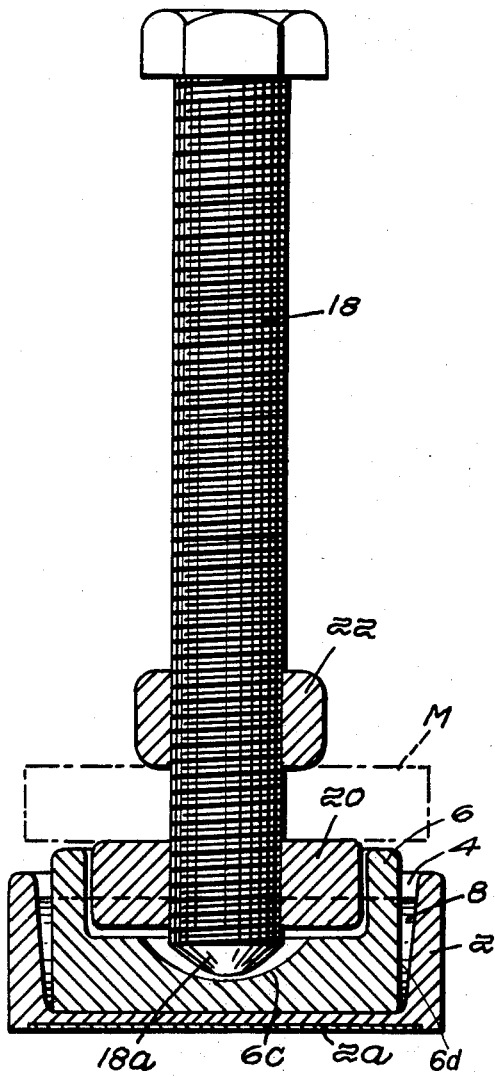
FIG. 4 is a cross section taken on the line 4—4 of FIG. 2.
Figure 5:
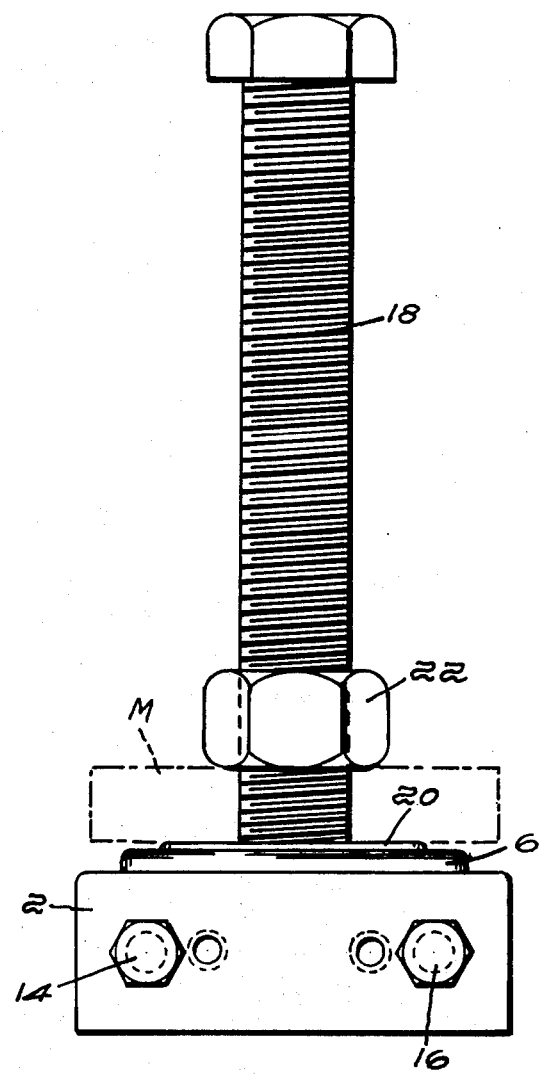
FIG. 5 is an elevational view of the machine mount assembly.
Figure 6:
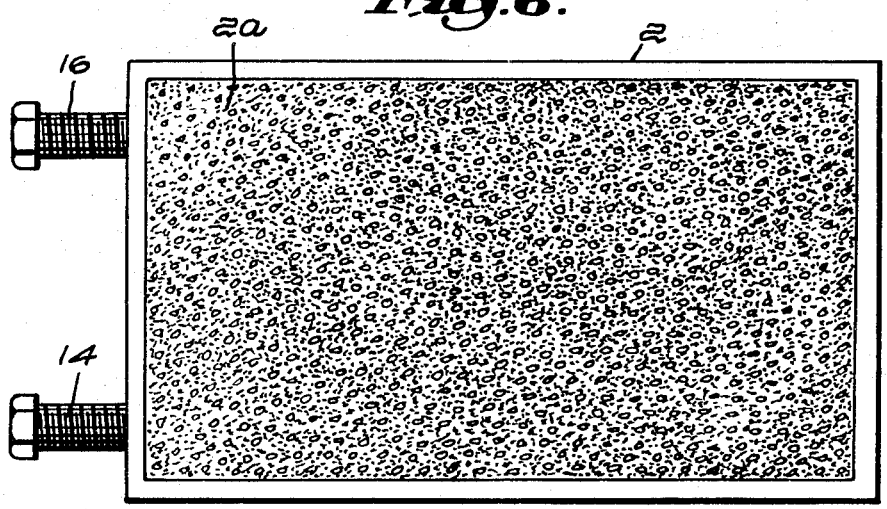
FIG. 6 is a bottom plan view of the base component illustrating diagrammatically an abrasive-embedded surface.

Considering in greater detail the structure indicated in the drawings, an assembled machine is shown in plan view in FIG. 2, and in FIGS. 3 to 5, inclusive, the machine mount is illustrated attached to a bottom portion of a machine M, indicated fragmentarily in broken lines.

As illustrated in these FIGS, numeral 2 denotes a novel base member which is formed with a special friction surface 2a for resting upon a floor or other supporting surface in a position to resist lateral displacement of the machine when shock forces are exerted. This friction surface 2a forms an important feature of the invention and, in one preferred embodiment, may consist in a metal layer to which is brazed a quantity of carbide grits which are indicated diagrammatically in FIG. 6. The carbide grits are embedded in a manner such that they may project outwardly from the surface of the metal layer to which they are brazed. Hardness of the carbide grits enable them to cut into most relatively softer floor materials commonly in use, and as a result, when shock forces occur, they tend to work the grits into the floor surface in a solidly anchored relationship which tends to hold a machine bottom in a fixed position.

In addition to the friction surface 2a described, the base member 2 is further characterized by means for containing shock forces in close proximity to the friction surface. As will be observed from an inspection of FIG. 1, the upper side of base 2 is recessed to form relieved edges 3 and 5 below which is formed an opening or well 4. The well 4 extends nearly from side to side of the base and is a depth such that the bottom of the well is located above and very close to the friction surface 2a.

In accordance with the invention, I combine with the base 2 a motion-limiting element 6 and means for spring loading this element in the base. Element 6 may, for example, comprise a bottom block of metal or other rigid material slidably received on the bottom surface of the well 4 immediately above the friction surface 2a. As illustrated in FIGS. 2 and 3, the member 6 is constructed of a box-like shape to fit into opening 4 and nearly fill the space between the relieved edges 3 and 5. The means for spring-loading the element 6 comprise a pair of resilient bodies 8 and 10 in spaces occurring between two opposite ends of the element 6 and adjacent inner wall surfaces of the base 2 occurring immediately below the relieved edges 3 and 5 as is best shown in FIGS. 1 and 3.

The resilient spring-loading bodies 8 and 10, in one desirable form, consist in cylindrically shaped elements of a length such that they extend between, and are snugly held at, opposite inner side walls of the well 4. An important feature of these spring-loading elements 8 and 10 is the relationship of their diameters to the space included by the relieved edges 3 and 5. As is best shown in FIG. 3, the diameters are chosen such that in each case, a peripheral portion projects beyond the edges 3 and 5 in a position to resiliently engage against adjacent surfaces of the member 6 and to overlie rib portions 6a and 6b formed at lower edges of the member 6. In this position, the resilient bodies described function to maintain the member 6 snugly against the bottom of well 4.

At one end of the base member 2, there is further provided a press bar 12 slidably received on the bottom of well 4 at points between the resilient member 10 and an adjacent vertical wall of base 2, as illustrated in FIG. 3. Pressure adjusting screws 14 and 16 are threaded into the end wall of member 6 to move the press bar inwardly against resilient member 10 and vary the stiffness of both these resilient bodies 8 and 10. By means of this controlled variation in stiffness, it becomes possible to contain the member 6 against displacement within very narrow levels operative to thereby prevent movement in space to any appreciable extent.

In further combination with the base 2 and the motion-limiting member 6, I provide a vertical support element 18 for securing the motion-limiting member 6 in interlocking relationship with a bottom of machine M in a manner such that shock forces exerted in the operation of the machine may be transmitted through the vertical support element 18 to the member 6 with little, if any, lost motion occurring. This interlocking relationship may be realized, for example, by solidly securing the bottom of the support element 18 within a rectangularly shaped opening 6d formed at the upper side of the member 6, or in the embodiment illustrated in FIGS. 1 – 6, by forming the bottom of element 18 with a shaped end 18a and locating this shaped end in a hollow recess 6c formed centrally of the rectangular shaped opening 6d at the upper side of member 6 to generally coincide in shape with that of end 18a. This provides for a solidly interlocked relationship of the parts. At its upper portion, the element 18 is adjustably secured to the bottom of the machine M, as suggested in FIG. 3. In a preferred form, the vertical support element 18 may comprise a threaded leveling bolt, as shown in the drawings, and on which is threaded a support block 20 and a lock nut 22. Thus the machine M may be readily placed in a level position and it will be observed that the support block 20 is constructed of a size and shape to loosely fit within the rectangularly shaped opening 6d and thus further functions to instantly center the end 18a in registered relationship to the hollow recess 6c.

It will be apparent that the motion-leveling means comprised by the motion-limiting member 6 in combination with base 2 and vertical support 18 provide a positive, rugged machine mount which can be instantly adjusted to deal with varying load stresses and which is convenient to utilize in carrying out a machine leveling operation.

In thus combining motion-limiting means with a base and a vertical support element, I may also provide an assembly of parts of a somewhat simplified form, as shown in FIG. 7. In this embodiment of the invention, I provide a base member 30 which may be used in some instances where a different range of shock forces are to be dealt with. In this form of the invention, the use of resilient spring-loading members may be eliminated and the upper side of base 30 is formed with a relatively deeply hollowed retaining surface 30a. In combination with this form of base, I have devised a motion-limiting means consisting in a cam block 32 which is formed with a rounded cam surface 32a of a size smaller than the hollowed retaining surface 30a so that lateral sliding movement is provided for. Thus cam block 32 is secured to the bottom of a vertical support element 34 comprising a leveling bolt of the character earlier described and adjustably secured to a machine bottom M' by a support block 36 and a lock nut 38.

It is pointed out that with this arrangement shown in FIG. 7 and just described, the weight of the machine is completely transmitted to the motion-limiting cam block in a manner such that if the machine weight is of a great enough magnitude, shock forces seeking to displace the cam block laterally along the surface 30 are required to lift the weight of the machine upwardly for some short distance, and in many cases, may be completely dissipated before any displacement can occur. Thus there is realized a unique method of supporting a machine and preventing its motion in space due to shock forces falling in some range of magnitude.

In FIG. 8, I have illustrated diagrammatically the limited displacement of the member 32 relative to the member 30, and as will be observed from the two sets of broken lines, the machine mount is confined within very narrow limits of travel.

I claim:

1. Machine mount construction for supporting a machine of the reciprocating screw injector molding type on a floor surface and limiting motion of the machine in space when shock forces are induced in one direction parallel to the floor surface in the normal operating cycle of the machine, said machine mount construction including a base having a layer of friction material solidly attached at the underside thereof for contacting the said floor surface and holding the base in a substantially fixed position, said base being recessed at its upper side to provide spaced apart retaining edges and a rectangularly shaped well lying below the edges, said well extending downwardly to define vertical end walls and a horizontal bottom slide surface occurring between the end walls in closely spaced relationship to the said layer of friction material, a motion limiting member comprising a solid block of metal constructed of a box-like shape to fit into the rectangularly shaped well, said motion limiting member being formed at its underside with a flat surface for slidably engaging against the horizontal slide surface of the well and exerting a frictional resistance to horizontal motion of the said machine induced by shock forces, opposite ends of the motion limiting member lying in spaced relation to the said retaining edges to form recesses, spring loading elements yieldably supported in said recesses between respective opposite ends of the motion limiting member and adjacent end walls of the base in a position to engage the ends of the motion limiting member and resiliently force the flat surface of the motion limiting member against the said horizontal slide surface of the well, the upper side of the motion limiting member being further formed with a rectangularly shaped opening, a threaded support bolt engageable with the bottom of the said machine for transmitting weight of the machine to the motion limiting member, said support bolt having a lower shaped bearing end located against the upper side of the motion limiting member in centrally disposed relation within the rectangularly shaped opening and said motion limiting member at its upper side being hollowed out to provide a bearing recess for containing the bearing end of the bolt, and a machine support block threaded onto the lower end of the support bolt within the rectangularly shaped opening for locating the machine in desired positions of vertical adjustment.

2. A structure according to claim 1 in which the said motion limiting member is formed at two opposite sides with retaining ribs which extend beneath respective adjacent surfaces of the spring loading elements.

3. A structure according to claim 1 in which the base member has located therein a press bar horizontally adjustable into contact with one of the spring loading elements and adjustment screw means for advancing the press bar against the contacted spring loading element and exerting variation in stiffness in each of the spring loading elements.

4. Machine mount construction for supporting a machine of the reciprocating screw injector molding type on a floor surface and limiting motion of the machine in space when shock forces are induced in one direction parallel to the floor surface in the normal operating cycle of the machine, said machine mount construction including a base having a layer of friction material solidly attached at the underside thereof for contacting the said floor surface and holding the base in a substantially fixed position, said base being recessed at its upper side to provide spaced apart retaining edges and a rectangularly shaped well lying below the edges, said well extending downwardly to define vertical end walls and a horizontal bottom slide surface occurring between the end walls in closely spaced relationship to the said layer of friction material, a motion limiting member comprising a block of material constructed of a box-like shape to fit into the rectangularly shaped well, said motion limiting member being formed at its underside with a flat surface for slidably engaging against the horizontal slide surface of the well and exerting a frictional resistance to horizontal motion of the said machine induced by shock forces, opposite ends of the motion limiting member lying in spaced relation to the said retaining edges to form recesses, spring loading elements yeildably supported in said recesses between respective opposite ends of the motion limiting member and adjacent end walls of the base in a position to engage the ends of the motion limiting member and resiliently force the flat surface of the motion limiting member against the said horizontal slide surface of the well, the upper side of the motion limiting member being further formed with a rectangularly shaped opening, a threaded support bolt engaged with the bottom of the said machine, said support bolt having a lower shaped bearing end located against the upper side of the motion limiting member in centrally disposed relation within the rectangularly shaped opening, and a machine support block threaded onto the lower end of the support bolt within the rectangularly shaped opening for releasably containing the support bolt in varying positions of vertical adjustment.

* * * * *